Nov. 25, 1969 W. B. GAUNT, JR 3,480,742

HYBRID CIRCUIT

Filed March 31, 1967

INVENTOR
W. B. GAUNT, JR.
BY
R. C. Winter
ATTORNEY

United States Patent Office 3,480,742

Patented Nov. 25, 1969

3,480,742

HYBRID CIRCUIT

Wilmer B. Gaunt, Jr., Boxford, Mass., assignor to Bell Telephone Laboratories, Incorporated, Murray Hill and Berkeley Heights, N.J., a corporation of New York Filed Mar. 31, 1967, Ser. No. 627,499
Int. Cl. H04b 3/38, 3/58
U.S. Cl. 179—170 13 Claims

ABSTRACT OF THE DISCLOSURE

A hybrid circuit for establishing signal transmission between a bidirectional two-wire line and the incoming and outgoing paths of a four-wire line is described. Incoming signals are coupled through an incoming amplifier to a single transistor circuit and therethrough to the bidirectional line. Outgoing signals from the bidirectional line are coupled through the single transistor circuit and an outgoing amplifier to the outgoing path. The single transistor circuit terminates the bidirectional line in its characteristic impedance.

BACKGROUND OF THE INVENTION

This invention is related to transmission circuits and more particularly to electronic hybrid circuits for establishing signal transmission between pairs of one-way transmission lines and bidirectional transmission lines in communication systems.

In telephone and similar communication systems, it is often required to couple a four-wire line comprising an incoming one-way transmission path and an outgoing one-way transmission path to a bidirectional two-wire transmission line so that signals can be transmitted therebetween. A hybrid circuit at the junction of the four-wire and two-wire lines permits signals from the incoming path to be coupled to the bidirectional line and signals from the bidirectional line to be coupled to the outgoing path but prevents unwanted coupling of signals between the incoming and outgoing paths. Such couplings between incoming and outgoing paths may cause undesirable interference and oscillations which substantially prevent signal transmission.

Special transformers and balancing circuits customarily have been used in hybrid arrangements. More efficient and more economical electronic hybrid circuits have been proposed to appropriately couple signals between four-wire and two-wire transmission lines. One form of such electronic hybrid circuit known in the art (Patent No. 2,511,948) consists of three amplifiers. The first amplifier, connected between the incoming path of a four-wire line and the bidirectional two-wire line, couples signals from the incoming path to the bidirectional line. The second amplifier, connected between the bidirectional line and the outgoing path of the four-wire line, couples signals on its input to the outgoing path. The output of the second amplifier contains both an amplified outgoing signal which originates on the bidirectional line and signals responsive to the incoming path signal. A third amplifier is connected between the incoming and the outgoing path to prevent the incoming path signal, coupled through the second amplifier, from reaching the outgoing line. If the phase relationship between the incoming path signals from the second and third amplifiers is properly arranged, these two signals cancel and only the outgoing signal from the bidirectional two-wire line is transmitted to the outgoing path. Because the cancellation occurs on the outgoing path, changes of conditions thereon can interfere with the hybrid action. Further, any differences in the output impedance of the amplifiers connected to the outgoing path result in unwanted phase differences between the signals to be canceled. Thus, a portion of the incoming path signal may remain uncanceled and then will appear on the outgoing line.

In a second form of hybrid circuit disclosed in my copending application Ser. No. 604,267, filed Dec. 23, 1966, the incoming path signal and the signal appearing on the bidirectional path in response thereto are combined in a portion of the circuit which is isolated from the outgoing path. Here, the cancellation of these signals is substantially unaffected by the conditions on the outgoing path of the four-wire line. Circuits of this type have required a plurality of active devices such as tubes or transistors to couple signals between a four-wire and a two-wire line. Unbalance of characteristics among these active devices and varying device parameters thereof may adversely affect hybrid circuit operation. This is especially true when the incoming path signal coupled from the incoming path to the point of cancellation and the signal responsive thereto coupled from the bidirectional path each passes through a different group of such active devices.

In view of the foregoing, it is an object of this invention to provide an improved electronic hybrid circuit.

It is another object of this invention to provide lossless means for establishing signal transmission between a four-wire line and a two-wire line in communication systems.

It is a further object of this invention to provide a simple and economical electronic hybrid circuit.

SUMMARY

These and other objects are attained by this invention in which signals from the incoming path and from the bidirectional line which are to be cancelled are coupled through a single active device so that the adverse effects of unbalanced characteristics and varying parameters of a plurality of active devices are avoided. In one illustrative embodiment, signals on the incoming path are applied to an incoming one-way amplifier and coupled therethrough to the base of a transistor. The output impedance of the incoming amplifier is adjusted to match the characteristic impedance of the bidirectional line. The incoming path signal is applied to the bidirectional line through the base-emitter path of the transistor. Signals from the bidirectional line are applied to the emitter and are coupled through the emitter-collector path of the transistor to the collector. The incoming path signal also is coupled through the transistor to the collector in inverted form and is canceled by the incoming path signal at the base in an impedance connected between the base and the collector. This impedance is also adjusted to match the characteristic impedance of the bidirectional line. The uncanceled outgoing signal at the collector is coupled to the outgoing path via an outgoing one-way amplifier, and signals from the bidirectional path appearing at the transistor base are blocked from the incoming path by the incoming one-way amplifier.

In accordance with another illustrative embodiment of this invention, signals from the incoming path are applied to the transistor base through an incoming one-way amplifier and a first transformer winding. The inverted signal at the collector responsive to the incoming path signal is canceled by the incoming path signal on the base in a second transformer winding connected between the base and the collector, first and second transformer windings having an equal number of turns. An impedance substantially equal to twice the characteristic impedance of the bidirectional line is connected across the transformer to match the characteristic impedance of the bidirectional line.

It is a feature of this invention that a single transistor circuit in a hybrid arrangement prevents transmission of signals from the incoming path to the outgoing path of a four-wire line.

It is another feature of this invention that a single transistor circuit matches the impedance of the hybrid circuit to the characteristic impedance of the bidirectional line at the junction therebetween.

It is yet another feature of this invention that an outgoing one-way amplifier isolates the circuit in which cancellation of incoming path signals occurs from the outgoing path, and an incoming one-way amplifier prevents outgoing signals from being transmitted to the incoming path.

DESCRIPTION OF THE DRAWING

A complete understanding of this invention together with the objects and features thereof may be obtained by considering the following detailed description and accompanying drawing in which.

DETAILED DESCRIPTION—FIG. 1

Figures 1, 2:
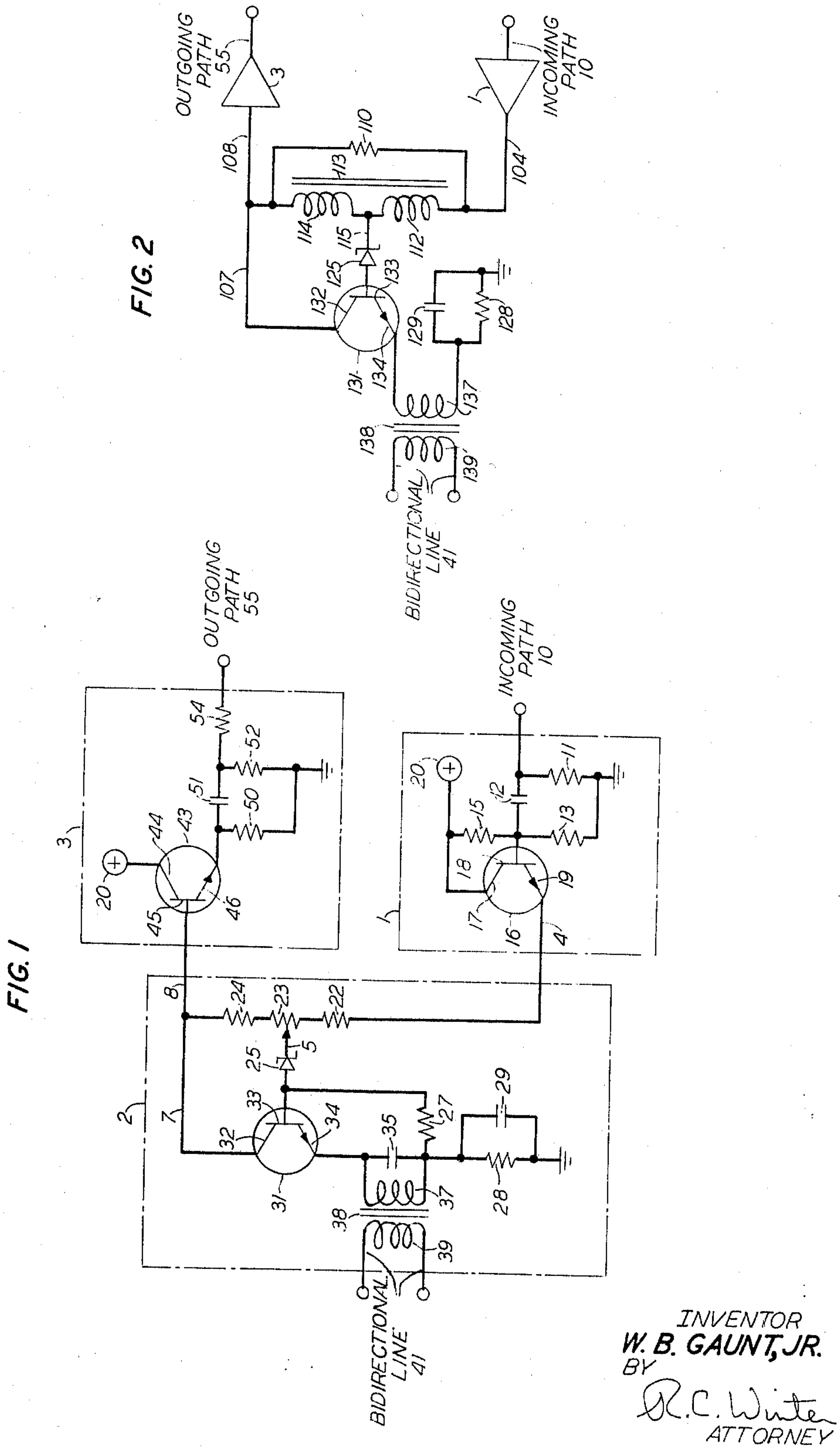
FIG. 1 is a schematic representation of one illustrative embodiment of this invention.
FIG. 2 is a schematic representation of a second illustrative embodiment of this invention.

Referring to FIG. 1, incoming path 10 is connected to amplifier 1 which comprises positive voltage source 20, transistor 16, base bias resistors 13 and 15, coupling capacitor 12, and input impedance 11. Capacitor 12 isolates the D.C. bias voltages on base 18 of transistor 16 from incoming path 10. Input impedance 11 is connected between the incoming path and ground and resistor 13 is connected between base 18 and ground. Impedance 11 is appropriately selected so that the input impedance of amplifier 1, which includes the parallel impedances of base 18, resistors 13 and 15, and impedance 11, matches the characteristic impedance of incoming path 10. Positive voltage source 20 is connected to one terminal of resistor 15 and to collector 17. The other terminal of resistor 15 is connected to base 18. Resistor 15 is selected so that transistor 16 is biased to operate in a linear mode. The output of amplifier 1 from emitter 19 is connected via lead 4 to impedance 22 of amplifier 2.

Amplifier 2 comprises transistor 31, input impedance 22, potentiometer 23, output impedance 24, and transformer 38. Impedance 22 is connected to one fixed terminal of potentiometer 23. The other fixed terminal of potentiometer 23 is connected to impedance 24 and therethrough to collector 32. The variable arm of potentiometer 23 is connected through Zener diode 25 to base 33. Zener diode 25 appropriately causes a drop in the D.C. voltage from potentiometer 23 to base 33 so that transistor 31 is biased in its linear region of operation. Resistor 27, connected between base 33 and the terminal of transformer winding 37 opposite emitter 34, permits current to flow to resistor 28 which appropriately biases emitter 34 through winding 37. The current through resistor 27 also passes through diode 25 to aid in establishing the D.C. voltage drop thereacross. Capacitor 29, connected across resistor 28, provides a short circuit path for signal frequencies so that all signal voltages from emitter 34 appear only across winding 37. Capacitor 29 also maintains a constant bias potential across resistor 28. Emitter 34 is connected to winding 37 of transformer 38 which couples signals from amplifier 2 to bidirectional line 41 via winding 39 and prevents D.C. voltages on winding 37 from appearing across bidirectional line 41. Capacitor 35 connected across winding 37 is adjusted so that the impedance seen by emitter 34 is resistive. Capacitor 35 balances out any inductive impedance appearing across the terminals of winding 37 due to transformer 38 and bidirectional line 41.

The output of amplifier 2 appears on collector 32 which is connected via leads 7 and 8 to amplifier 3. Amplifier 3 comprises transistor 43, emitter resistor 50, coupling capacitor 51, impedance 52, and impedance 54. Collector 44 of transistor 43 is connected to positive voltage source 20. Base 45 is connected to the output of amplifier 2 and through series-connected impedances 22, 24 and potentiometer 23 to amplifier 1. The D.C. voltage on emitter 19 of transistor 16 in amplifier 1 thereby provides bias current for base 45 of transistor 43 so that it operates in its linear region. Resistor 50, which is connected to emitter 46, completes the D.C. emitter-collector path of transistor 43. Coupling capacitor 51, one terminal of which is connected to emitter 46, isolates the outgoing path 55 from the D.C. bias voltage on emitter 46, but permits signal frequencies to pass therethrough. The second terminal of capacitor 51 is connected to the junction of series-connected impedances 52 and 54. The other terminal of impedance 54 is connected to outgoing path 55, and the other terminal of impedance 52 is connected to ground. The impedance of the combination of resistor 50 and impedances 52 and 54 together with the output impedance on emitter 46 is designed to match the characteristic impedance of outgoing path 55.

The circuit of FIG. 1 operates in the following manner. An incoming path signal from path 10 is transmitted through capacitor 12 to base 18 of transistor 16. Capacitor 12 blocks any D.C. bias voltage on base 18 from incoming path 10. Impedance 11 is selected so that the parallel combination of resistor 13, resistor 15, base 18, and impedance 11 matches the incoming path impedance and there is no reflection of the incoming path signal back to incoming path 10. Resistors 15 and 13 apply an appropriate bias current from positive voltage source 20 to base 18. Thus, transistor 16 operates in its linear range. Since transistor 16 is connected as an emitter-follower, collector 17 is directly connected to positive voltage source 20. Therefore no signal appears on collector 17 and substantially all of the incoming path signal voltage appears on emitter 19 in accordance with the well-known principles of transistor operation. While transistor 16 is connected as an emitter-follower, it is to be understood that other amplifier configurations may be appropriately used. For example, a multistage transistor amplifier using common emitter stages well known in the art may also couple signals from incoming path 10 to amplifier 2. The main function of amplifier 1 is to isolate amplifier 2 from incoming path 10 so that signals appearing on the input of amplifier 2 are not transmitted to incoming path 10 and the impedance across incoming path 10 is substantially independent of amplifiers 2 and 3.

Impedance 22, potentiometer 23, and zener diode 25 couple the incoming path signal appearing on emitter 19 to base 33 of transistor 31. It should be noted that if capacitor 35 is adjusted to compensate for inductive impedances appearing across winding 37, impedances 22 and 24 may be simple resistors which can appropriately match a resistive bidirectional line.

The incoming path signal is coupled through the base-emitter path of transistor 31 to emitter 34. Since capacitor 29 is a short circuit to all signal frequencies, the signal at emitter 34 responsive to the incoming path signal appears across winding 37. It is coupled through transformer 38 to bidirectional line 41. In this manner, incoming path signals are transmitted from incoming path 10 to bidirectional line 41 in accordance with the principles of this invention. Transformer 38 may have a unity turns ratio so that the characteristic impedance of the bidirectional line is directly reflected to emitter 34. It is understood that other turns ratios may also be used.

An inverted incoming path signal appears on collector 32 in response to the signal output of amplifier 1. In order to prevent this inverted incoming path signal from being transmitted to outgoing path 55 via amplifier 3, lead 5 is connected via potentiometer 23, impedance 24 and lead 7 to collector 32. The portion of the signal on lead 5 from emitter 19 is noninverted and is effective to cancel the inverted signal from collector 32. The portion of the incoming path signal from emitter 19 that appears on lead 5 is adjusted by means of the variable arm of potentiometer 23 so that complete cancellation can be obtained.

The setting on potentiometer 23 is arranged to compensate for variations in characteristics of bidirectional line 41. It is adjusted to obtain the greatest transhybrid loss, i.e., minimum incoming path signal on outgoing path 55.

Outgoing signals applied to bidirectional line 41 appear across transformer winding 39 and are coupled through transformer 38 to emitter 34. No portion of the outgoing signal from the bidirectional line appears across resistor 28 since capacitor 29 is substantially a short circuit as signal frequencies. Also, the value of resistor 27 is chosen to be sufficiently high to prevent transmission of signals through it. Thus, the outgoing signal is isolated from base 33, but resistor 27 appropriately biases emitter 34.

The outgoing signal from the bidirectional line on emitter 34 is coupled through the emitter-collector path of transistor 31 to collector 32 and therefrom to base 45 of transistor 43 in amplifier 3. Transistor 43 is operated as an emitter-follower. Thus, collector 44 is connected directly to positive voltage source 20 and emitter 46 is connected via coupling capacitor 51 and impedance 54 to outgoing path 55. Only the outgoing signal from bidirectional line 41 appears on base 45. This is so because the inverted incoming path signal on collector 32 has been canceled by the noninverted signal coupled from emitter 19 via impedance 22 and potentiometer 23 to lead 5. The outgoing signal is coupled from collector 32 through the base-emitter path of transistor 43 to emitter 46, and therethrough to outgoing path 55 via coupling capacitor 51 and impedance 54. As is well known in the art, the input impedance of an emitter-follower is generally very high so that the impedance at base 45 does not affect the operation of amplifier 2. The low output impedance at emitter 46, however, necessitates the use of a series-impedance 54 to match the characteristic impedance of outgoing path 55. It is to be understood that the emitter-follower circuit of amplifier 3 is given by way of example only. Other amplifier configurations may be appropriately used in amplifier 3 provided that these also exhibit a high input impedance and an appropriate output impedance.

The incoming signal is excluded from amplifier 3 because the inverted incoming path signal at collector 32 is canceled by the incoming path signal transmitted through impedance 22 and potentiometer 23. To illustrate how this cancellation takes place, assume that a signal from incoming path 10 causes a signal voltage $v_1$ to appear on lead 4. Further assume that the impedance between leads 4 and 5 and the impedance between leads 5 and 7 are each equal to the characteristic impedance $Z_c$ of line 41 which is reflected onto winding 37. As hereinbefore noted, the resistance of resistor 27 is very high so that the impedances between leads 4 and 5 and 5 and 7 are unaffected by it. Since the input impedance of amplifier 3 is very high compared to the characteristic impedance of line 41 and the impedance at base 33 is also very high, substantially all the signal current $i$ from lead 4 passes through impedance 22, potentiometer 23, impedance 24, and the collector-emitter path of transistor 31 to winding 37.

In accordance with well known principles of transistor operation, the signal voltage at emitter 34 due to $v_1$ is the same as the signal voltage at base 33. Zener diode 25 is substantially a short circuit to signal voltage frequencies. Thus, voltage $v_1$ causes a signal voltage, $v_1/2$, to appear both on lead 5 and on emitter 34. This is so because the same current flows through the impedance between leads 4 and 5 and the characteristic impedance $Z_c$ of line 41 and these impedances are equal. The signal voltage drop between leads 5 and 8 is also equal to $v_1/2$ because the collector current $i$ passes through the impedance between leads 5 and 8 which is equal to the characteristic impedance of line 41. But the signal voltage on lead 5 is $v_1/2$. This voltage less the voltage drop between leads 5 and 8 is zero. Therefore no signal voltage responsive to $v_1$ appears on lead 8.

An outgoing signal voltage, e.g., $v_2$, across winding 39 from bidirectional line 41 is unaffected by the foregoing cancellation. This voltage causes an equal voltage to appear across winding 37 since transformer 38 has a one-to-one turns ratio. Consequently a signal voltage $v_2$ is supplied to emitter 34 and this voltage causes a signal current $i_2$ to flow through collector 32, resistor 24, potentiometer 23, resistor 22, and the very low output impedance of amplifier 1. A signal voltage of $v_2$ is established at base 33 in accordance with the known principles of transistor operation and a signal voltage $2v_2$ appears on lead 8. The voltage $2v_2$ is established on lead 8 because this impedance between leads 4 and 5 is equal to the impedance between leads 5 and 8 at signal frequencies and current $i_2$ passes through both. The only voltage on lead 8 is twice the outgoing signal voltage $2v_2$ from line 41 and this signal passes through the base-emitter path of transistor 43 substantially without attenuation. It is coupled via coupling capacitor 51 and impedance 54 to outgoing path 55. Thus, in accordance with the principles of this invention, no portion of the incoming path signal is applied to outgoing path 55, but signals from the bidirectional line are applied thereto.

It is important that bidirectional line 41 be terminated in its characteristic impedance $Z_c$ since an impedance mismatch between line 41 and the hybrid circuit permits reflections on line 41 which interfere with both signal transmission on line 41 and the blocking of the incoming path signal from outgoing path 55 as hereinbefore described. The impedance of the hybrid circuit terminating line 41 at signal frequencies is substantially the impedance between emitter 34 and ground. This is so in this embodiment because transformer 38 has a one-to-one turns ratio and capacitor 29 is a short circuit at signal frequencies.

In order to determine that the impedance at emitter 34 is matched to line 41, it is only necessary to show that the signal voltage at emitter 34 is the same as the signal voltage drop across line 41, i.e., one-half the input signal voltage, since the same signal current flows through the line and the emitter. The signal voltage drop across the line is entirely due to its characteristic impedance $Z_c$. Thus, if the current through the impedance $Z_c$ of line 41 is the same as the current through emitter 34, and the voltage across the line is the same as the voltage at emitter 34, the impedance at emitter 34 must be equal to $Z_c$.

Assume that a voltage $v$ is applied to bidirectional line 41 and that a signal current $i_1$ flows into emitter 34 as a result thereof. The current at collector 32 is substantially the same as this current $i_1$ in accordance with well known transistor principles. Because the input impedance to amplifier 3 is very high, all this current must flow through impedance 24, potentiometer 23, impedance 22, and emitter 19. Emitter 19 is part of an emitter-follower circuit, the output impedance of which is very low as is well known in the art. Under ideal conditions the impedance between leads 5 and 4 is equal to the characteristic impedance of bidirectional line 41 as hereinbefore noted. The signal voltage coupled from base 33 to emitter 34 is the current $i_1$ multiplied by the characteristic impedance of line 41, $Z_c$. But the voltage drop across line 41 is also $iZ_c$ since this voltage drop is entirely due to the characteristic impedance of the line. Therefore, the voltage drop across the line is equal to the voltage drop between emitter 34 and ground, and the line is terminated in its characteristic impedance as desired.

DETAILED DESCRIPTION—FIG. 2

Referring to FIG. 2 which shows a second embodiment of this invention, incoming path 10 is connected to amplifier 1, and outgoing path 55 is connected to amplifier 3. These amplifiers are the same as those shown in FIG. 1. The output of amplifier 1 is connected via lead 104 to one terminal of winding 112, the other terminal of which is connected to lead 115 and to a terminal of winding 114.

Both windings have an equal number of turns, and they form transformer 113. The second terminal of winding 114 is connected via lead 108 to amplifier 3 and via lead 107 to collector 132. Lead 115 is connected to base 133 via Zener diode 125 which Zener diode provides a D.C. bias voltage shift so that transistor 131 operates in a linear mode.

Impedance 110 is connected between leads 104 and 108 and is selected to be twice the characteristic impedance of line 41 so that as hereinafter described the impedance at emitter 134 matches the impendance of line 41. Emitter 134 is connected to one terminal of winding 137 which together with winding 139 forms transformer 138. The turns ratio of transformer 138 in this embodiment is unity. But, where appropriate, other turns ratios may be selected. Transformer 138 couples signals between emitter 134 and line 41. Winding 137 is also connected in series with the parallel combination of resistor 128 and capacitor 129. Resistor 128 biases emittter 134 so that transistor 131 operates in a linear mode. Capacitor 129 provides a short circuit at signal frequencies but maintains a constant d.c. voltage across resistor 128.

The circuit of FIG. 2 operates as follows. A signal from the incoming path is coupled through amplifier 1 to lead 104 in the same manner as hereinbefore described with respect to FIG. 1. The signal voltage at lead 104 is substantially the same as the signal voltage on the incoming line and current flows through impedance 110 causing a portion of this signal voltage to appear on lead 115. This portion of the signal voltage is applied through Zener diode 125 to base 133 substantially without attenuation. It is then coupled through the base-emitter path of transistor 131 to emitter 134 and therefrom to line 41 via transformer 138. In this manner the incoming path signal is coupled to bidirectional line 41 in accordance with the principles of this invention.

A portion of the incoming path voltage across impedance 110 appears across each winding of transformer 113. Because the turns ratio of transformer 113 is unity, one-half of the incoming path voltage appears across winding 112 and the other half appears across winding 114. The incoming path voltage transmitted to emitter 134 is coupled through the emitter-collector path of transistor 131 to collector 132 so that an inverted signal that is one-half of the incoming path voltage on lead 104 appears on lead 107. This inverted signal is subtracted from the equal and noninverted voltage on lead 115. In this manner no incoming path signal voltage appears at the input of amplifier 3 or on outgoing path 55.

Because an outgoing voltage signal from bidirectional line 41 is applied only to emitter 134 and not to base 133, it is coupled via the emitter-collector path of transistor 131 to amplifier 3 and therefrom to outgoing path 55. Twice the outgoing voltage appears on lead 108 as in the circuit of FIG. 1. No portion of this outgoing signal is transmitted to incoming path 10 because amplifier 1 which is unidirectional isolates signals on lead 104 from incoming path 10. The output impedance of amplifier 1 being very low does not permit any portion of the outgoing signal to appear across amplifier 1.

To show in detail how the incoming path signal is excluded from amplifier 3 and outgoing line 55, assume a signal current $i$ flows through impedance 110 in response to an incoming path signal applied to incoming path 10. The current through impedance 110 is the same current that passes through lead 107, collector 132, the collector-emitter path of transistor 131, and transformer 138 to bidirectional line 41 because of the high input impedance of amplifier 3. Impedance 110 may be appropriately selected to be equal to twice the characteristic impedance $Z_c$ of line 41 as previously noted. In this embodiment the output impedance of amplifier 1 is made very low so that only the impedance of impedance 110 need be considered. The signal voltage at emitter 134 then is substantially the same as the voltage on lead 115 which is $iZ_c$.

In accordance with well-known transistor principles, a voltage drop of $iZ_c$ appears across winding 114 because of the signal current $i$ in collector 132. But the signal voltage $iZ_c$ on lead 115 is equal and opposite to the signal voltage drop of $iZ_c$ across winding 114. Therefore, there is no voltage on lead 108 due to the incoming path signal. Consequently, no portion of the incoming path signal is applied to amplifier 3.

Impedance 110 also permits the hybrid circuit to be matched to the characteristic impedance of bidirectional line 41. As previously described, a current $i$ through impedance 110 causes a voltage $iZ_c$ to appear on lead 115. This voltage is transmitted to emitter 134. Since the voltage across bidirectional line 41 due to the same current $i_1$ also causes a drop of $iZ_c$, the impedance between emitter 134 and ground of the hybrid circuit is equal to the characteristic impedance of the line. In this way the hybrid circuit impedance is matched to bidirectional line 41.

The principles of this invention have been described with reference to the foregoing particular embodiments. Numerous other arrangements and variations of these embodiments may be devised by those skilled in the art without departing from the scope and spirit of the invention. For example, impedance 22 of FIG. 1 may be removed from its position therein and placed between emitter 34 and transformer winding 37 and impedance 24 modified accordingly; the output impedance of amplifier 1 may be appropriately selected to eliminate a separate impedance 22, or amplifier 1 and amplifier 3 may have gains greater than unity to provide lossless coupling between the bidirectional line and the four-wire line.

What is claimed is:

1. A hybrid circuit for coupling an incoming path and an outgoing path to a bidirectional line comprising coupling means having first, second and third electrodes, means for coupling signals from said incoming path to said first electrode, means connected to said second electrode for applying said coupled incoming path signals to said bidirectional line and for coupling signals from said bidirectional line to said second electrode, means connected to said third electrode for applying the coupled signals from said bidirectional line to said outgoing path, and means connected between said first and third electrodes for blocking the application of coupled incoming path signals appearing at said third electrode to said outgoing path.

2. A hybrid circuit for coupling an incoming path and an outgoing path to a bidirectional line comprising a transistor having a base, an emitter and a collector, means for coupling signals from said incoming line to said base, means connected to said emitted for applying said coupled incoming path signals to said bidirectional line and for coupling outgoing signals from said bidirectional line to said emitter, means connected to said collector for applying the coupled outgoing signals to said outgoing path, and means connected between said base and collector for blocking the coupled incoming path signals appearing at said collector from said outgoing path.

3. A hybrid circuit in accordance with claim 2, wherein said means for blocking the coupled incoming path signals from said outgoing path comprises means for canceling the inverted coupled incoming path signals appearing at said collector with said coupled incoming path signal appearing at said base.

4. A hybrid circuit in accordance with claim 3 wherein said means for coupling signals from said incoming path to said base comprises an amplifier connected to said incoming path and an impedance connected between said amplifier and said base, wherein said canceling means comprises an impedance connected between said base and said collector and wherein said means for applying the coupled outgoing signals to said outgoing path comprises an amplifier connected between said collector and said outgoing path.

5. A hybrid circuit in accordance with claim 4 wherein said impedance connected between said amplifier and said base and said impedance connected between said base and said collector each matches the characteristic impedance of said bidirectional line.

6. A hybrid circuit connected between a two-wire line and the incoming and outgoing paths of a four-wire line for coupling signals from said incoming path to said two-wire line and for coupling only signals from said two-wire line to said outgoing path comprising a device having input, control and output terminals, means for coupling signals from said incoming path to said control terminal, means connected to said input terminal for applying the incoming path signal to said two-wire line and for applying signals from said two-wire line to said input terminal, means connected to said output terminal for applying said signals from said two-wire line to said outgoing path, and means connected between said control and output terminals for preventing the application of the inverted incoming path signal appearing at said output terminal to said outgoing path.

7. A hybrid circuit according to claim 6 wherein said means for coupling signals from said incoming path to said control terminal comprises a first impedance and said means for preventing the application of the inverted incoming path signal to said outgoing path comprises a second impedance, said first and second impedances being jointly adjustable to match the impedance of said two-wire line.

8. A hybrid circuit in accordance with claim 6 wherein said device comprises a single transistor, said input terminal comprises an emitter, said control terminal comprises a base, said output terminal comprises a collector, and said means for preventing the application of the incoming path signal to said outgoing path comprises impedance means for canceling the inverted incoming signal appearing at said collector with said incoming path signal coupled to said base.

9. A hybrid circuit in accordance with claim 8 wherein said means for coupling signals from said incoming path to the base comprises an amplifier having an input connected to said incoming path and an output connected to the base, the impedance at said amplifier output being equal to the characteristic impedance of said two-wire line, and wherein the impedance means connected between the base and the collector comprises an impedance equal to the characteristic impedance of said two-wire line.

10. A hybrid circuit for coupling an incoming path and an outgoing path to a bidirectional line comprising a transistor having a base, an emitter and a collector, means for coupling a portion of a signal applied to said incoming path to the base, means connected to the emitter for applying the coupled portion of said incoming path signal to said bidirectional line and for coupling a signal from said bidirectional line to the emitter, and means connected to the collector for applying only said signal coupled from said bidirectional line to said outgoing path comprising means connected between the base and the collector for canceling the inverted incoming path signal appearing at the collector with the portion of said incoming path signal applied to the base.

11. A hybrid circuit in accordance with claim 10 wherein said means for coupling a portion of said incoming path signal to the base comprises an amplifier, a first transformer winding and a zener diode, said amplifier being connected between said incoming path and one terminal of said first transformer winding, the other terminal of said first transformer winding being connected to the base through said zener diode, wherein said means for canceling the inverted incoming path signal appearing at the collector comprises a second transformer winding connected between said other terminal of said first transformer and the collector and wherein an impedance is connected between said one terminal of said first transformer and the collector.

12. A hybrid circuit in accordance with claim 11 wherein the number of turns of said first and second transformer windings are equal and wherein said impedance connected between said one terminal of said first transformer and the collector is twice the characteristic impedance of said bidirectional line.

13. In a communication system, a hybrid circuit for establishing signal transmission between a four-wire line and a two-wire line comprising a transistor having base, emitter and collector electrodes, a first amplifier connected between the incoming path of said four-wire line and said base electrode for applying an incoming signal to said two-wire line connected to said emitter electrode, a second amplifier connected between said collector electrode and the outgoing path of said four-wire line for applying an outgoing signal from said two-wire line to said four-wire line, and impedance means connected between said base and collector electrodes for applying said incoming signal to said collector electrode to cancel the inverted incoming signal appearing at said collector electrode, said first amplifier being connected in the circuit so as to block the application of said outgoing signal to said incoming path.

References Cited

UNITED STATES PATENTS

| | | | |
|---|---|---|---|
| 2,916,861 | 7/1960 | Chen | 179—170 |
| 3,180,947 | 4/1965 | Haselton et al. | 179—170 |

KATHLEEN H. CLAFFY, Primary Examiner

WILLIAM A. HELVESTINE, Assistant Examiner